US008393398B2

(12) United States Patent
Makogon et al.

(10) Patent No.: US 8,393,398 B2
(45) Date of Patent: Mar. 12, 2013

(54) DEVICE FOR CONTROLLING SLUGGING (75) Inventors: Taras Yurievich Makogon, Houston, TX (US); Graham John Brook, Middlesex (GB)

(73) Assignee: BP Exploration Operating Company Limited, Middlesex (GB)

( * ) Notice: Subject to any disclaimer, the term of this patent is extended or adjusted under 35 U.S.C. 154(b) by 232 days.

(21) Appl. No.: 11/992,051

(22) PCT Filed: Sep. 12, 2006

(86) PCT No.: PCT/GB2006/003390
§ 371 (c)(1),
(2), (4) Date: Jun. 11, 2009

(87) PCT Pub. No.: WO2007/034142
PCT Pub. Date: Mar. 29, 2007

(65) Prior Publication Data
US 2009/0301729 A1 Dec. 10, 2009

(51) Int. Cl.
*E21B 7/12* (2006.01)
(52) U.S. Cl. ......... 166/345; 166/347; 166/357; 166/359
(58) Field of Classification Search .................. 166/345, 166/347, 357, 350–355, 359, 367, 260.15; 137/8, 236.1; 405/224.2–224.4, 195.1; 703/9, 703/10; 261/96; 175/25, 38
See application file for complete search history.

(56) References Cited

U.S. PATENT DOCUMENTS 3,461,916 A * 8/1969 Ledgerwood ................. 138/120
3,841,357 A * 10/1974 Heijst .......................... 138/120
(Continued)

FOREIGN PATENT DOCUMENTS

| GB | 2 280 460 | 2/1995 |
| WO | 87/01759 | 3/1987 |

(Continued)

OTHER PUBLICATIONS

International Search Report for PCT/GB2006/003390, mailed Jan. 18, 2007.
(Continued)

*Primary Examiner* — Thomas Beach
*Assistant Examiner* — Aaron Lembo
(74) *Attorney, Agent, or Firm* — Nixon & Vanderhye (57) ABSTRACT

A device for inhibiting severe slug flow in a multiphase fluid stream flowing through a pipeline and into a riser, wherein, the device is positioned immediately upstream of the riser and comprises at least one unit comprising (i) an upwardly inclined section of pipe having a lower end and an upper end and (ii) either a substantially horizontal section of pipe having a first end and a second end or a downwardly inclined section of pipe having an upper end and a lower end, wherein the lower end of the upwardly inclined section of pipe is connected either directly or indirectly with the pipeline, the upper end of the upwardly inclined section of pipe is connected either directly or indirectly with the first end of the horizontal section of pipe or with the upper end of the downwardly inclined section of pipe, and the second end of the horizontal section of pipe or the lower end of the downwardly inclined section of pipe is connected either directly or indirectly with the riser, and wherein the angle of inclination of the upwardly inclined section of pipe is in the range 5 to 90° to the horizontal, and the length of the upwardly inclined section of pipe is in the range 1 to 30 feet.

23 Claims, 4 Drawing Sheets

U.S. PATENT DOCUMENTS

| | | | |
|---|---|---|---|
| 4,099,582 A * | 7/1978 | Bell | 175/5 |
| 4,227,872 A * | 10/1980 | Zink et al. | 431/90 |
| 4,451,183 A * | 5/1984 | Lorenz | 406/94 |
| 4,705,114 A | 11/1987 | Schroeder et al. | |
| 5,232,475 A | 8/1993 | Jepson | |
| 5,478,504 A | 12/1995 | de Almeida Barbuto | |
| 5,553,976 A * | 9/1996 | Korsgaard | 405/195.1 |
| 6,041,803 A * | 3/2000 | De Almeida et al. | 137/14 |
| 6,079,498 A * | 6/2000 | Lima et al. | 166/370 |
| 6,139,644 A * | 10/2000 | Lima | 134/8 |
| 6,158,508 A * | 12/2000 | Lemetayer et al. | 166/250.15 |
| 6,230,809 B1 * | 5/2001 | Korsgaard | 166/352 |
| 6,267,182 B1 * | 7/2001 | Lima | 166/335 |
| 6,321,844 B1 * | 11/2001 | Thiebaud et al. | 166/345 |
| 6,349,536 B1 * | 2/2002 | Fujioka | 60/775 |
| 6,367,566 B1 * | 4/2002 | Hill | 175/57 |
| 6,651,745 B1 * | 11/2003 | Lush et al. | 166/357 |
| 6,668,943 B1 * | 12/2003 | Maus et al. | 175/5 |
| 6,679,949 B2 * | 1/2004 | De Almeida | 134/8 |
| 6,716,268 B2 | 4/2004 | Molyneux et al. | |
| 6,739,804 B1 * | 5/2004 | Haun | 405/195.1 |
| 6,857,822 B2 * | 2/2005 | Hooper et al. | 405/224.4 |
| 7,395,864 B2 * | 7/2008 | Ramachandran et al. | 166/310 |
| 7,464,762 B2 * | 12/2008 | Duret et al. | 166/357 |
| 7,490,671 B2 * | 2/2009 | Gramme et al. | 166/357 |
| 7,516,794 B2 * | 4/2009 | Gramme et al. | 166/357 |
| 7,565,932 B2 * | 7/2009 | Lawson | 166/344 |
| 7,721,807 B2 * | 5/2010 | Stoisits et al. | 166/366 |
| 7,749,462 B2 * | 7/2010 | Caro et al. | 422/196 |
| 2002/0193976 A1 | 12/2002 | Duret et al. | |
| 2004/0163817 A1 * | 8/2004 | Horton, III | 166/367 |
| 2005/0238440 A1 * | 10/2005 | Jordan et al. | 405/224.2 |
| 2007/0028984 A1 * | 2/2007 | Caro et al. | 138/177 |
| 2008/0017550 A1 * | 1/2008 | Caro et al. | 208/132 |
| 2008/0053659 A1 * | 3/2008 | Kinnari et al. | 166/367 |
| 2008/0264645 A1 * | 10/2008 | Shen et al. | 166/357 |

FOREIGN PATENT DOCUMENTS

| | | |
|---|---|---|
| WO | WO 2004/015237 A2 | 2/2004 |
| WO | WO 2004016907 A1 * | 2/2004 |
| WO | WO 2004/083706 A1 | 9/2004 |

OTHER PUBLICATIONS

Written Opinion of the International Searching Authority, mailed Jan. 18, 2007.

* cited by examiner

Flow

Fig.8

Flow

DEVICE FOR CONTROLLING SLUGGING

This application is the U.S. national phase of International Application No. PCT/GB2006/003390, filed 12 Sep. 2006, which designated the U.S. and claims benefit to U.S. Provisional Application No. 60/717,748, filed 19 Sep. 2005, the entire contents of each of which are hereby incorporated by reference.

This invention relates to a method and a device for controlling the occurrence of severe slugging in a riser that is used for conveying a multiphase fluid stream comprising a gaseous phase and a liquid phase from a subsea pipeline to a surface production facility.

BACKGROUND OF THE INVENTION

Multiphase pipelines are used in the oil and gas production industry for transporting multiphase fluid streams comprising a liquid phase (typically, comprising oil and/or gas condensate and produced water) and a gaseous phase from offshore production wells to a nearby surface production facility.

Typically, a pipeline located on the seabed may be connected to an ascending underwater flow line, known as a "riser", which conveys the produced fluids up to the surface production facility, preferably, to a gas-liquid separator for separating the gaseous phase from the liquid phase.

In certain pipeline/riser configuration "slugging" flow can occur. This condition refers to the situation where the flow rate of the separate gaseous and liquid phases from out of the top of the riser is not steady and oscillates between largely (or all) gas and largely (or all) liquid. This situation can lead to three significant problems, typically:
1) Flooding of the inlet gas/liquid separator vessel due a large "slug" of liquid arriving, the volume of which is more than the available liquid capacity in this vessel. This may lead to emergency shutdowns.
2) Unsteady operating conditions in the topside equipment. This can lead to failure to meet product specifications; typically failure to meet the regulations for the amount of oil contaminating the produced water discharge, and failure to meet the specified water content in the export oil, both owing to difficulties in achieving a stable oil/water interface. In addition, this can lead to problems in controlling the gas compressors of the surface production facility owing to the unsteady flow of feed gas to such units from the gas/liquid separators, which may result in some flaring of gas.
3) High stress loads may be imposed on the riser (where the riser is connected to the pipeline and the production facility) owing to liquid slugs arriving at the facility at high velocity with a tendency for the slugs to accelerate out of the pipeline.

The classical example of severe slugging occurs when three conditions are fulfilled. These are:
(i) a downwardly sloping pipeline;
(ii) a low velocity of the multiphase flow leading to a stratified fluid stream, and
(iii) the underwater pipeline connects to a riser.

Thus, the slope of the pipeline and the velocity of the multiphase fluid flow create conditions under which the stream in the flow line assumes a stratified-type flow pattern, with the gas flowing above the liquid. This segregation of the gas into the upper part of the inclined pipeline is the determining factor for the establishment of the severe-slugging phenomenon.

Severe slugging is characterized by a cyclical four-stage process, as follows:

Stage I: The multiphase flow does not have sufficient energy to transport the liquid up the riser and the liquid therefore accumulates at the base of the riser. Over time, a slug of liquid is formed, blocking the passage of gas. Gas pressure upstream of the blocking liquid slug increases forcing the forming liquid slug into the riser so that a head of liquid ascends through the riser. The column of liquid creates a hydrostatic pressure which increases as the column lengthens, this hydrostatic pressure being substantially equal to the increasing gas pressure in the pipeline upstream of the liquid slug. The length of the liquid slug may reach from 1 to several riser lengths in extreme cases.

Stage II: The upper level of the liquid slug reaches the top of the riser and the liquid begins to flow into the separator. At this point, the hydrostatic pressure is at a maximum.

Stage III: The increasing gas pressure behind the liquid slug becomes sufficient to overcome the hydrostatic head of the liquid and a gas pocket or bubble is forced into the lower end of the riser and begins to move up the riser. At this stage, there is essentially a fixed gas pressure acting on a diminishing head. The excess of gas pressure over the hydrostatic pressure causes the slug to shoot up the riser at high speed. The gas that has built up behind the liquid slug then discharges to the separator as a sudden gas surge (gas blow-through).

Stage IV: Once the gas surge has discharged into the separator, the multiphase flow has insufficient energy to carry the liquid up the riser (as Stage I). The liquid falls down the wall of the riser and begins to accumulate at the base of the riser thereby initiating a new cycle.

The slug of liquid followed by the gas surge can threaten to overwhelm the production facility. The gas blow-through is generally detected as a high pressure in the separator and a pressure detector means operates to cause valve means to close thereby shutting off the riser from the production facility and also closing down operation of the facility. This means that production is stopped whilst the effects of the severe slugging are dealt with and production may not be resumed for at least several hours thereby causing financial loss which can be exacerbated by the possibility of resumed production having to be initially at a low level and then progressively increased to the normal rate.

A number of approaches have been adopted to reduce or eliminate the effects of severe slugging. The use of a choke to control severe slugging is referred to in Oil and Gas Journal 12 Nov. 1979 at pages 230 to 238. Thus, stabilization of the flow may be achieved by introducing a localised pressure drop (head loss) due to a choke to the flow, at the top of the riser. The counter-pressure imposed by the choke at the surface is proportional to the velocity of flow past it. In this way, slugging is halted and the flow may be stabilized.

Gas lift has been employed to reduce the hydrostatic pressure of the column of liquid in the riser with a view to achieving a reduction in pressure in the line and keeping the liquid moving in the riser. This is achieved by injecting gas at the base of the riser. However, since the phenomenon of severe slugging cannot be readily controlled, it is generally necessary to inject large amounts of gas, which requires considerable compression means. Furthermore, injection of large amounts of gas substantially modifies the gas to oil ratio, which complicates the phase separation operations at the surface production facility.

GB 2 280 460 relates to an apparatus for inserting into a conduit such as a riser. The apparatus includes a tubular member having an external width less than the internal width of the conduit and mounting means to mount the tubular member within the conduit. The apparatus has the advantage that by reducing the flow volume of the conduit, slugging problems can be reduced and can usually be mitigated, especially when used in conjunction with gas lift.

U.S. Pat. No. 6,041,803 relates to a device for eliminating severe slugging in a stream in a flow line including a riser, the device comprising a body having a convergent nozzle section positioned in the flow line where the stream is about to enter the riser. The body further includes a divergent diffuser section with the convergent nozzle section and the divergent diffuser section defining an internal passage of the body with a geometric configuration such that it introduces a pressure drop which promotes a reorganization of phases in the multiphase flow, thereby converting the stratified flow pattern into a non-stratified flow pattern so that the multiphase stream passes up the riser.

U.S. Pat. No. 6,716,268 relates to a method of controlling occurrence of severe slugging in a riser that conveys a multiphase fluid system from a pipeline to a separation vessel for separation of a gas phase of the fluid system from a liquid phase. The separation vessel means is provided with a gas outlet comprising valve means to regulate speed of gas flow along the pipeline towards the riser in at least a vicinity of a lower end of the riser. The method comprises observing pressure in the pipeline at a position adjacent to said riser, and varying an extent to which the valve means is open so as to vary gas velocity in the pipeline to a value opposing or preventing occurrence of severe slugging in the riser.

However, there remains the need for further devices and methods for controlling the occurrence of severe slug flow.

SUMMARY OF THE INVENTION

The present invention proposes the use of a device for inhibiting severe slug flow in a multiphase pipeline connected to a riser by reducing the length of the liquid slugs and increasing the frequency of the discrete liquid slugs so that the pressure of the gaseous phase behind the discrete liquid slugs is sufficiently high to transport the slugs up the riser.

Thus, according to the present invention there is provided, a device for inhibiting severe slug flow in a multiphase fluid stream flowing through a subsea pipeline and into a riser, wherein, the device is positioned immediately upstream of the riser and comprises at least one unit comprising (i) an upwardly inclined section of pipe having a lower end and an upper end and (ii) either a substantially horizontal section of pipe having a first end and a second end or a downwardly inclined section of pipe having an upper end and a lower end, wherein
the lower end of the upwardly inclined section of pipe is connected either directly or indirectly with the pipeline, the upper end of the upwardly inclined section of pipe is connected either directly or indirectly with the first end of the horizontal section of pipe or with the upper end of the downwardly inclined section of pipe, and the second end of the horizontal section of pipe or the lower end of the downwardly inclined section of pipe is connected either directly or indirectly with the riser, and wherein the angle of inclination of the upwardly inclined section of pipe is in the range 5 to 90° to the horizontal, and the length of the upwardly inclined section of pipe is in the range 1 to 30 feet.

Accordingly, the unit comprises an upwardly inclined section of pipe upstream of a downwardly inclined section of pipe or a horizontal section of pipe.

The length of the substantially horizontal section of pipe or of the downwardly inclined section of pipe ("downhill" section) should be sufficiently short so as to avoid the flow regime returning from plug flow (or intermittent flow) to stratified flow. Preferably, the length of the substantially horizontal section of pipe or of the downwardly inclined section of pipe is less than 30 feet, preferably, less than 20 feet.

Where the pipeline is raised from the seabed, for example, by being supported on stilts, the unit of the device may additionally comprise a downwardly inclined section of pipe upstream of the upwardly inclined section of pipe. Thus, the upper end of this optional downwardly inclined section of pipe is joined to the raised pipeline and the lower end of the optional downwardly inclined section of pipe is joined either directly or indirectly to the lower end of the upwardly inclined section of pipe.

Where the unit of the device comprises a downwardly inclined section of pipe (upstream and/or downstream of the upwardly inclined section of pipe), the angle of inclination of the downwardly inclined section(s) of pipe is suitably in the range 5 to 90° to the horizontal. Typically, the downwardly inclined section(s) of pipe has a length in the range 1 to 30 feet. The angle of inclination of the downwardly inclined section(s) of pipe may be the same or different to the angle of inclination of the upwardly inclined section ("uphill" section) of pipe. Where the unit of device comprises a downwardly inclined section of pipe upstream and downstream of the upwardly inclined section of pipe, the angle of inclination of the downwardly inclined pipe sections may be the same or different.

The unit of the device may be formed of straight sections of pipe. Preferably, the joints between the straight sections of pipe of the unit, the joint between the unit and the pipeline and the joint between the unit and riser have a bend radius of at least 3 pipe diameters, preferably, at least 5 pipe diameters to avoid damaging the pipe and to allow pigging of the pipeline, device and riser. Where the unit of the device comprises a downwardly inclined section of pipe, it is preferred that the unit is provided with connecting straight section(s) of pipe that link the upwardly and downwardly inclined straight pipe sections. Preferably, the connecting straight section(s) of pipe is generally substantially horizontal. Typically, the length of the connecting section(s) of pipe is in the range 1 to 20 feet, preferably, 1 to 10 feet. Thus, the unit may comprise an uphill-horizontal, an uphill-horizontal-downhill or a downhill-horizontal-uphill-horizontal arrangement.

Where the unit is formed of straight sections of pipe, the upwardly inclined section of pipe, the connecting section(s) of pipe and the downwardly inclined section(s) of pipe may be in substantially the same vertical plane. Alternatively, the longitudinal axis of the connecting section(s) of pipe may be at an angle to the longitudinal axis of the upwardly and downwardly inclined sections of pipe. In particular, the longitudinal axis of the connecting section(s) of pipe may be substantially perpendicular to the longitudinal axes of the upwardly and downwardly inclined sections of pipe such that there are abrupt changes in direction to the flow of the multiphase fluid stream.

Alternatively, the unit may comprise curved sections of pipe. Accordingly, the unit may be inverted U-shaped or, where the pipeline is raised on stilts, U-shaped or S-shaped. Where the sections of the pipe are curved, the angle of inclination of the upwardly and downwardly inclined pipe sections is determined by taking a tangent to the steepest part of the curved pipe sections.

The pipe sections of the device are preferably preformed. The pipe sections may be joined together at the surface and the assembled device is then lowered into place on the seabed or the preformed pipe may be joined together at the seabed. Suitably, the pipe sections of the device are joined by welding. The device may also be joined to the pipeline and riser by welding. If necessary, the pipework of the device may be supported by a subsea supporting structure, for example, a frame or scaffolding.

The correct positioning of the device upstream of the riser and the correct dimensioning of the unit (for example, the length of the upwardly inclined section of pipe and/or the angle of inclination of the upwardly inclined section of pipe) inhibits severe slug flow in a multiphase fluid stream. Without wishing to be bound by any theory, it is believed that the device of the present invention inhibits the phenomenon of severe slug flow by establishing short liquid slugs that are capable of passing up the riser under the influence of the pressure of the gaseous phase that builds up behind each discrete short liquid slug. Thus, the flow regime changes from severe slug flow to plug flow or intermittent flow. Minor slugging is acceptable in multiphase risers and presents no operational problems for the surface production facility. The device of the present invention eliminates significant fluctuations in pressure and rate of flow, thereby normalizing the flow and stabilizing the operation of the surface production facility.

In a further embodiment of the present invention there is provided a method of inhibiting severe slug flow in a multiphase fluid stream that is flowing through a pipeline and into a riser wherein the multiphase fluid stream comprises a gaseous phase and a liquid phase, the method comprising:
 a) providing a device immediately upstream of the riser, the device comprising at least one unit comprising (i) an upwardly inclined section of pipe having a lower end and an upper end and (ii) either a substantially horizontal section of pipe having a first end and a second end or a downwardly inclined section of pipe having an upper end and a lower end, wherein the lower end of the upwardly inclined section of pipe is connected either directly or indirectly with the pipeline, the upper end of the upwardly inclined section of pipe is connected either directly or indirectly with the first end of the horizontal section of pipe or with the upper end of the downwardly inclined section of pipe, and the second end of the horizontal section of pipe or the lower end of the downwardly inclined section of pipe is connected either directly or indirectly with the riser, and wherein the angle of inclination of the upwardly inclined section of pipe is in the range 5 to 90° to the horizontal, and the length of the upwardly inclined section of pipe is in the range 1 to 30 feet;
 b) passing the multiphase fluid stream from the pipeline through the device and into the riser, the device inducing a change in the flow regime from severe slug flow to discrete plug flow wherein discrete slugs of liquid phase separated by spacers of gaseous phase are generated by the device and the volume of each discrete slug of liquid phase is sufficiently small that the pressure of the spacer of gaseous phase behind each discrete slug of liquid phase is sufficient to transport the discrete slug of liquid phase up the riser.

In a preferred aspect of the method of the present invention there is provided a method of inhibiting severe slug flow in a multiphase fluid stream that is flowing through a pipeline and into a riser wherein the multiphase fluid stream comprises a gaseous phase and a liquid phase, the method comprising:
 a) providing a device immediately upstream of the riser, the device comprising at least one unit comprising (i) an upwardly inclined section of pipe having a lower end and an upper end and (ii) either a substantially horizontal section of pipe having a first end and a second end or a downwardly inclined section of pipe having an upper end and a lower end, wherein the lower end of the upwardly inclined section of pipe is connected either directly or indirectly with the pipeline, the upper end of the upwardly inclined section of pipe is connected either directly or indirectly with the first end of the horizontal section of pipe or with the upper end of the downwardly inclined section of pipe, and the second end of the horizontal section of pipe or the lower end of the downwardly inclined section of pipe is connected either directly or indirectly with the riser, and wherein the angle of inclination of the upwardly inclined section of pipe is in the range 5 to 90° to the horizontal, and the length of the upwardly inclined section of pipe is in the range 1 to 30 feet;
 b) passing the multi-phase fluid from the pipeline through the device so that the liquid phase accumulates at the base of the upwardly inclined section of pipe thereby forming a liquid slug that backs-up the upwardly inclined section of pipe;
 c) allowing the pressure of the gaseous phase to increase behind the liquid slug to a sufficient extent that the liquid slug is forced through either the substantially horizontal section of pipe or the downwardly inclined section of pipe of the device and upwardly through the riser to a surface production facility.

Advantages of the present invention include:
1) the surface production facility may have a smaller gas-liquid separator vessel as there is less risk of a long slug overwhelming the separator vessel;
2) the well may be kept in production for longer periods of time between shut-downs;
3) the device may allow an increase in production owing to a lower riser back-pressure and to a reduction in variations in the back-pressure;
4) the gas-liquid separator in the surface production facility does not experience such severe pressure surges as occur with severe slugging; and
5) a reduction in mechanical wear to the equipment of the surface production facility and a decrease in strain to the riser and to the riser "hang-off" stress joint.

The pipeline is an underwater pipeline for transporting a multiphase-fluid stream from a subsea hydrocarbon production well to a riser. The multiphase-fluid stream comprises a liquid phase and a gaseous phase. Suitably, the liquid phase of the multiphase-fluid stream comprises oil and/or gas condensate and produced water. Suitably the gaseous phase of the multiphase fluid stream is comprised of natural gas. Typically, the flow regime of the multiphase fluid stream in the pipeline is stratified flow. The pipeline may be downwardly sloping. However, this is not an essential feature of the present invention.

Suitably, the pipeline has an internal diameter of 6 to 30 inches, preferably 12 to 28 inches, more preferably, 14 to 20 inches. The pipeline may be a bare steel pipe, an insulated pipe or pipe-in-pipe. Preferably, the device is formed of pipe sections having the same construction as the pipeline.

Where the riser is connected to a "fixed" platform, the riser will normally be a vertical riser. Generally, such vertical risers are formed of steel and have a length of up to 500 metres, for example 30 to 400 metres. Vertical risers typically have an inner diameter of 12 to 24 inches, preferably, 16 to 20 inches. Where the riser connects to a Floating Production Vessel (FPV) the riser will normally be formed of a flexible pipe in an "S" shape or catenary shape. Typically, such flexible pipe risers have a length of up to 4000 metres, for example 1000 to 2,500 metres. Flexible pipe risers typically have an inner diameter of 4 to 12 inches, preferably, 6 to 10 inches, for example, 8 inches.

Suitably, the upwardly inclined section of pipe of the unit(s) of the device has a length of at least 3 times the riser diameter, preferably, at least 6 times the riser diameter so that the liquid slugs that are generated by the device form a stable seal across the riser. Generally, the upwardly inclined section of pipe has a length of at least 2 feet, preferably, at least 3 feet, for example, at least 5 feet. Preferably, the upwardly inclined section of pipe has a length of 5 to 30 feet, preferably, 5 to 20 feet.

Preferably, the angle of inclination of the upwardly inclined section of pipe and of any downwardly inclined section(s) of pipe of the unit(s) is in the range 5 to 85°, more preferably, 10 to 75°, for example, 25 to 50° to the horizontal. Where the upper end of the upwardly inclined section of pipe is connected to a downwardly inclined section of pipe, the angle of inclination of the downwardly inclined section of pipe may be steeper than that of the upwardly inclined section of pipe. For example, the downwardly inclined section of pipe may be at an angle of 75 to 90° to the horizontal while the upwardly inclined section of pipe may be at an angle of 25 to 50° to the horizontal. A steep downwardly inclined section of pipe will assist in preventing the plug (or intermittent) flow from returning to a stratified flow regime.

Generally, the length of the shorter slugs of liquid that are delivered to the riser is approximately equal to the length of the upwardly inclined section(s) of pipe of the device. Suitably, the slugs are at least 5 times, preferably, at least 10 times shorter than the length of the slugs that are formed in the absence of the device. Preferably, the device is configured such that the volume of the shorter slugs can be readily processed by the gas-liquid separator of the surface production facility. Suitably, the frequency of the slugs is at least 30 times, for example, at least 50 times higher than the frequency of the slugs in the absence of the device. For example, the frequency of the slugs may increase from once per day to every 0.5 hour or from every 15 minutes to every 30 seconds.

Preferably, the device comprises a plurality of units arranged in series with the pipeline connected to the first unit in the series and the riser connected to the last unit in the series. Preferably, 2 to 10, for example, 3 to 7 units are arranged in series.

The units in the series may be linked together via connecting straight section(s) of pipe. Preferably, the connecting straight section(s) of pipe is substantially horizontal. However, it is also envisaged that the connecting section(s) of pipe may be of a curved configuration. For example, the device may comprise a plurality of inverted U bends linked together via connecting sections of either straight or curved pipe. Where the pipeline is raised on stilts, the device may comprise a plurality of U-bends linked together via connecting section (s) of either straight or curved pipe. Where the device comprises a plurality of units joined together by connecting section(s) of pipe, the units may be joined together in such a manner that they are concertinaed, thereby allowing the device to occupy a shorter distance between the pipeline and the riser.

Alternatively, the device may comprise a plurality of units, where each unit comprises an upwardly inclined section of pipe connected to a substantially horizontal section of pipe. For example, the device may have an "uphill-horizontal-uphill-horizontal" or an "uphill-horizontal-uphill-horizontal-uphill-horizontal" arrangement.

Suitably, the internal diameter of the pipework of the device is substantially the same as the internal diameter of the riser. However, it is also envisaged that the internal diameter of the pipework of the device may be greater than or less than the internal diameter of the riser. Where the internal diameter of the pipework of the device is greater than the internal diameter of the riser, the velocity of the multiphase fluid stream through the device will be lower than through the riser. This means that a liquid slug will build-up in the vertically inclined section(s) of the device before severe slug flow would have been expected to commence in the riser in the absence of the device. Where the internal diameter of the pipework of the device is less than the internal diameter of the riser, the velocity through the device will be greater than the velocity through the riser. This means that severe slug flow could commence in the riser before a liquid slug begins to build up in the upwardly inclined section(s) of the device. Accordingly, the internal diameter of the pipework should be correctly dimensioned so as to avoid commencement of severe slug flow in the riser before commencement of generation of liquid slugs in the device.

Advantageously, the device of the present invention may be used in conjunction with gas lift. It is envisaged that gas may be injected either upstream or downstream of the device to assist in transporting the short liquid slugs up the riser.

The device may also have a geometry that introduces swirl or turbulence into the flow thereby assisting in breaking up the flow into short liquid slugs that are capable of being transported up the riser. For example, the geometry may allow gas bubbles to become dispersed in the liquid slug thereby assisting in raising the liquid slug through the riser.

Suitably, the inner walls of the upwardly inclined section (s) of pipe and/or any downwardly inclined pipe section(s) of the device may be provided with grooves or fin formations for creating swirl in the flow. Suitably, the grooves or fin formations are in the form of a helix, for example, a single helix or multiple helix that is arranged along the longitudinal axis of the upwardly inclined section(s) of pipe and/or any downwardly inclined section(s) of pipe. Alternatively, the upwardly inclined pipe section(s) and/or any downwardly inclined pipe section(s) may be formed from twisted pipe. For example, the pipe may be of oval cross-section and is twisted about its longitudinal axis thereby creating swirl in the flow.

Although the invention is described above with reference to associated risers, it may also be applied to steeply inclined pipelines where the device is positioned upstream of the steeply inclined pipeline.

The device of the present invention has a simple construction, is inexpensive to manufacture, and can be readily installed in a pipeline, in particular, in the vicinity of a riser. The invention also has the advantage of providing a relatively simple, cheap and reliable retrofit solution to mitigate severe slugging in a riser.

Yet a further advantage of the invention is that is that cleaning pigs can be run through the pipeline and riser with the device in place. Thus, the device is configured (in particular, the diameter of the pipework and the bend radii) to allow a cleaning pig to readily pass from the pipeline through the device into the riser and vice-versa.

A further advantage of the device of the present invention is that when production is shut-in and flow stops, the liquid phase would be expected to accumulate in the lower sections of the device and the gaseous phase in the upper sections of the device. Accordingly, the gas in the upper sections of the device breaks up the liquid phase of the multiphase flow. This should allow for a smooth restart of production.

BRIEF DESCRIPTION OF THE DRAWINGS

The invention will now be described with reference to the Figures.

FIG. 1 shows a device 1 according to the present invention positioned between a descending pipeline 2 and an underwater riser 3. The riser may be formed from flexible pipe having an "S" shape (shown in broken lines) or catenary shape (shown in solid lines). The underwater riser 3 is connected by way of example to a separator vessel 4. The device 1 comprises an upwardly inclined section of pipe 5, a downwardly inclined section of pipe 6 and a connecting section of pipe 7. A liquid slug 8 is shown in the upwardly inclined section of pipe 5.

Figure 1:
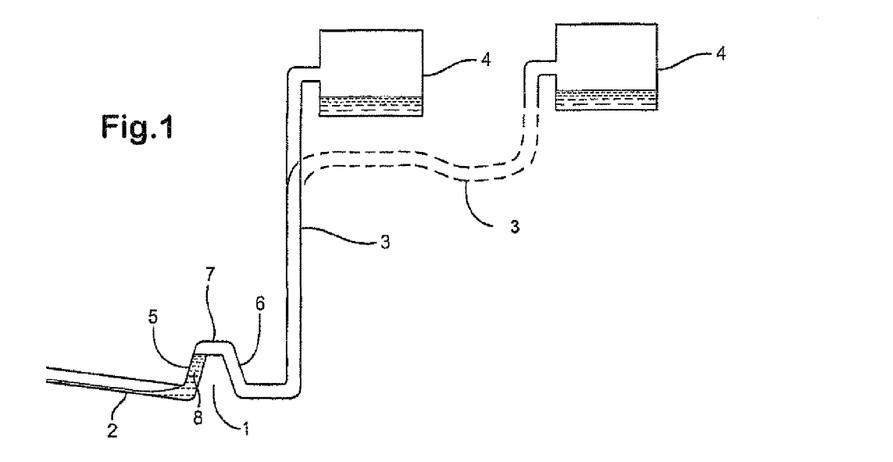
Figure 2:
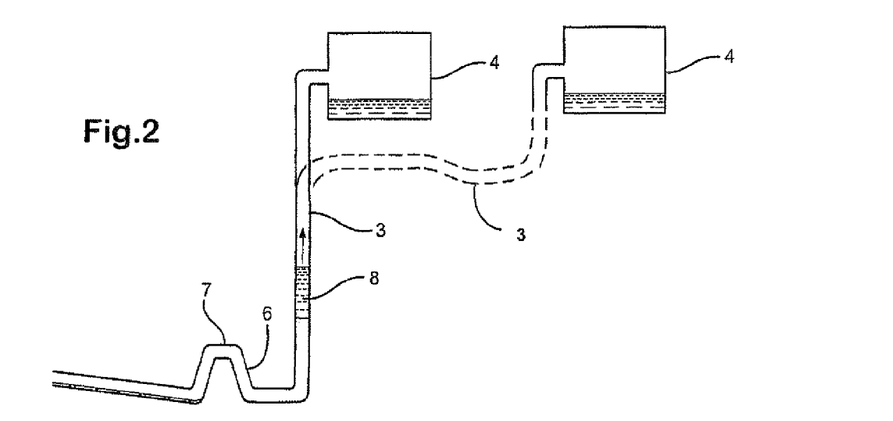
FIG. 2 shows the stage where the build up of gas pressure behind the liquid slug 8 has forced the liquid slug 8 through the connecting section of pipe 7 and the downwardly inclined section of pipe 6 and into the riser 3. The riser may be formed from flexible pipe having an "S" shape (shown in broken lines) or catenary shape (shown in solid lines).
Figure 3:
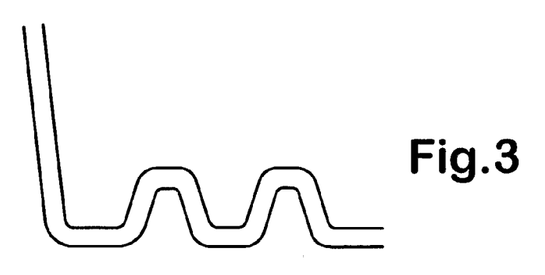
FIGS. 3 to 10 show configurations of preferred devices according to the present invention.
Figure 4:
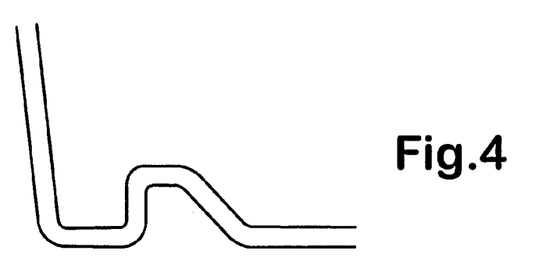
Figure 5:
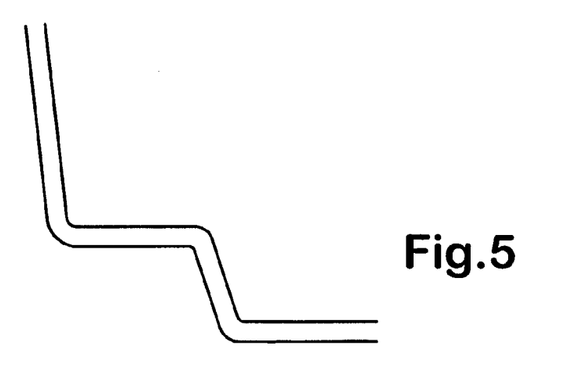
Figure 6:
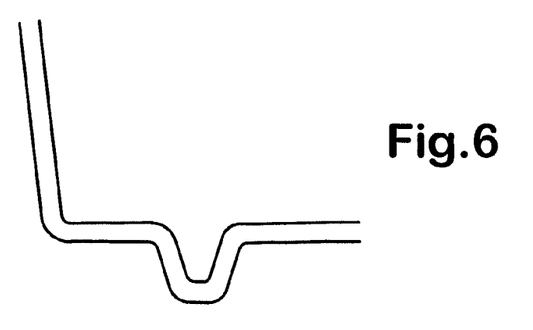
Figure 7:
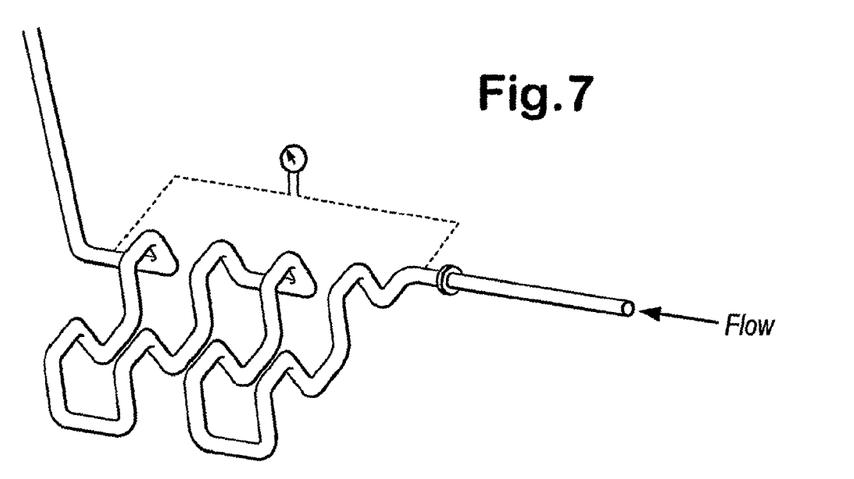
Figure 8:
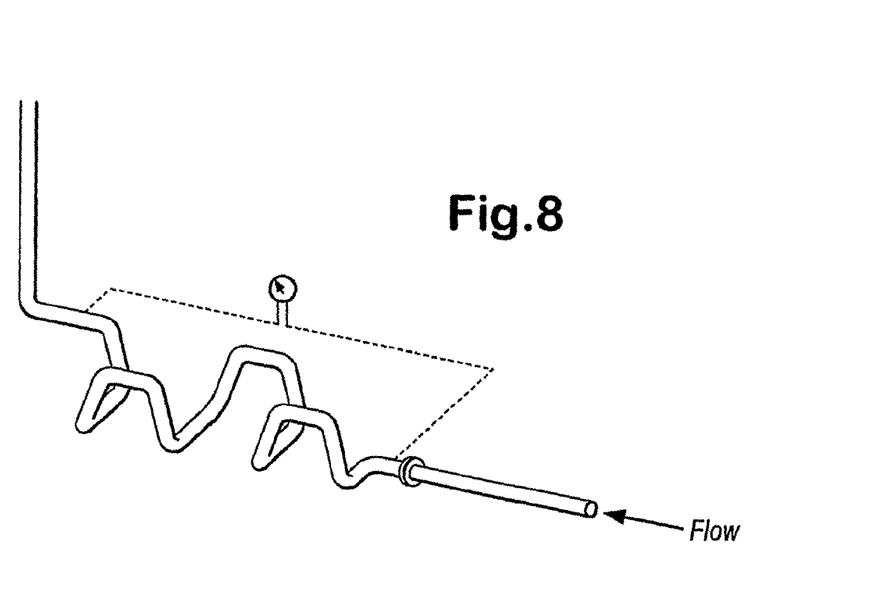
Figure 9:
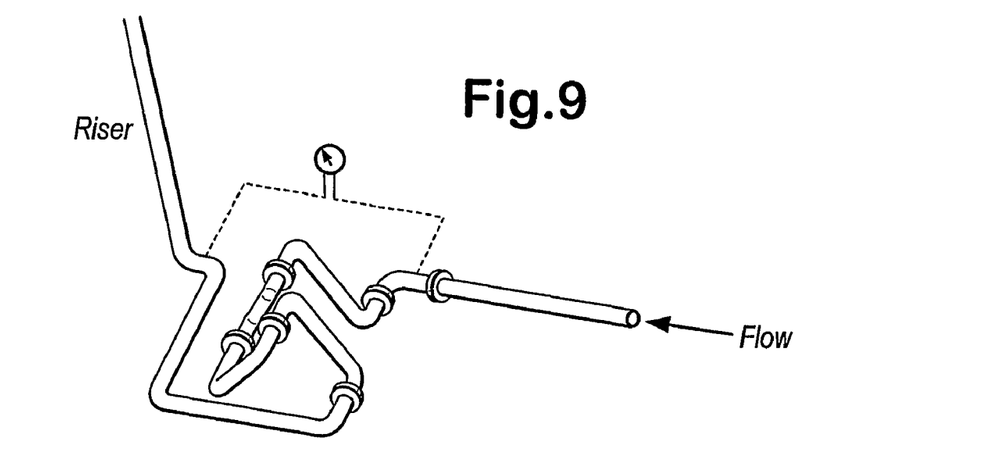
Figure 10:
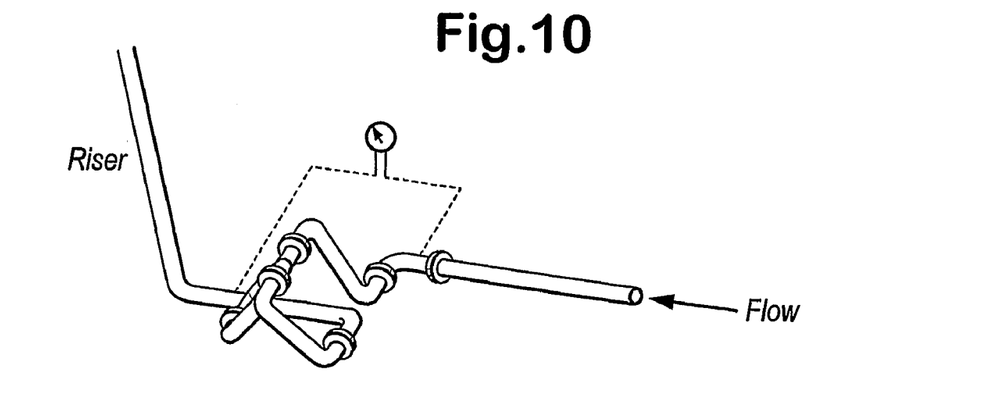

The invention claimed is:

1. A device for inhibiting severe slug flow in a multiphase fluid stream flowing through a subsea pipeline and into a riser, wherein the device is positioned upstream of the riser and comprises at least one unit comprising (i) an upwardly inclined section of pipe having a lower end and an upper end and (ii) either a substantially horizontal section of pipe having a first end and a second end or a downwardly inclined section of pipe having an upper end and a lower end, wherein the lower end of the upwardly inclined section of pipe is connected either directly or indirectly with the pipeline, the upper end of the upwardly inclined section of pipe is connected either directly or indirectly with the first end of the horizontal section of pipe or with the upper end of the downwardly inclined section of pipe, and the second end of the horizontal section of pipe or the lower end of the downwardly inclined section of pipe is connected either directly or indirectly with the riser, and wherein the angle of inclination of the upwardly inclined section of pipe is in the range 5 to 90° to the horizontal, and the length of the upwardly inclined section of pipe is in the range 1 to 30 feet so that the device causes the multiphase flow to create a liquid slug in the upwardly inclined section of the pipe to cause gas from the multiphase flow to accumulate upstream of the liquid slug until pressure in the gas is sufficient to move the liquid slug downstream along the pipeline.

2. A device as claimed in claim 1 wherein the length of the substantially horizontal section of pipe or of the downwardly inclined section of pipe of the unit is less than 30 feet.

3. A device as claimed in claim 1 wherein the upper end of the upwardly inclined section of pipe is connected either directly or indirectly to the upper end of a downwardly inclined section of pipe having an angle of inclination in the range 5 to 90° to the horizontal.

4. A device as claimed in claim 1 wherein at least one of the inner walls of the upwardly inclined section of pipe and any downwardly inclined section of pipe of the unit are provided with helical grooves or fin formations.

5. A device as claimed in claim 1 wherein at least one of the upwardly inclined section of pipe and any downwardly inclined section of pipe of the unit is formed from pipe that is twisted about its longitudinal axis.

6. A device as claimed in claim 1 wherein the unit of the device is formed from straight sections of pipe and the joints between the straight sections of pipe, the joint between the device and the pipeline and the joint between the device and riser have a bend radius of at least 3 pipe diameters.

7. A device as claimed in claim 6 wherein the unit of the device additionally comprises a connecting straight section of pipe having a length of 1 to 20 feet that links the upwardly and downwardly inclined straight sections of pipe.

8. A device as claimed in claim 7 wherein the longitudinal axis of the connecting section of pipe is substantially perpendicular to the longitudinal axes of the upwardly and downwardly inclined straight sections of pipe of the unit.

9. A device as claimed in claim 1 wherein the unit of the device is formed from curved sections of pipe.

10. A device as claimed in claim 9 wherein the unit of the device is inverted U-shaped or S-shaped.

11. A device as claimed in claim 1 wherein the pipe sections of the unit are joined by welding and the device is joined to the pipeline and riser by welding.

12. A device as claimed in claim 1 wherein the device is connected to a pipeline having an internal diameter of 6 to 30 inches and the device is formed of pipe having the same construction as the pipeline.

13. A device as claimed in claim 1 wherein the device is connected to a vertical riser having a length of up to 500 meters and an inner diameter of 12 to 24 inches.

14. A device as claimed in claim 1 wherein the device is connected to a riser formed from flexible pipe having an "S" shape or catenary shape, a length of up to 4000 meters and an inner diameter of 4 to 12 inches.

15. A device as claimed in claim 1 wherein the device comprises a plurality of units arranged in series with the pipeline connected to the first unit in the series and the riser connected to the last unit in the series.

16. A device as claimed in claim 15 wherein the device comprises 2 to 10 units arranged in series.

17. A method of inhibiting severe slug flow in a multiphase fluid stream that is flowing through a pipeline and into a riser wherein the multiphase fluid stream comprises a gaseous phase and a liquid phase, the method comprising:
a) providing a device upstream of the riser, the device comprising at least one unit comprising (i) an upwardly inclined section of pipe having a lower end and an upper end and (ii) either a substantially horizontal section of pipe having a first end and a second end or a downwardly inclined section of pipe having an upper end and a lower end, wherein the lower end of the upwardly inclined section of pipe is connected either directly or indirectly with the pipeline, the upper end of the upwardly inclined section of pipe is connected either directly or indirectly with the first end of the horizontal section of pipe or with the upper end of the downwardly inclined section of pipe, and the second end of the horizontal section of pipe or the lower end of the downwardly inclined section of pipe is connected either directly or indirectly with the riser, and wherein the angle of inclination of the upwardly inclined section of pipe is in the range 5 to 90° to the horizontal, and the length of the upwardly inclined section of pipe is in the range 1 to 30 feet;
b) passing the multiphase fluid stream from the pipeline through the device and into the riser, the device inducing a change in the flow regime from severe slug flow to discrete plug flow wherein discrete slugs of liquid phase separated by spacers of gaseous phase are generated by the device and the volume of each discrete slug of liquid phase is sufficiently small that the pressure of the spacer of gaseous phase behind each discrete slug of liquid phase is sufficient to transport the discrete slug of liquid phase up the riser.

18. A method of inhibiting severe slug flow in a multiphase fluid stream that is flowing through a pipeline and into a riser wherein the multiphase fluid stream comprises a gaseous phase and a liquid phase, the method comprising:

a) providing a device upstream of the riser, the device comprising at least one unit comprising (i) an upwardly inclined section of pipe having a lower end and an upper end and (ii) either a substantially horizontal section of pipe having a first end and a second end or a downwardly inclined section of pipe having an upper end and a lower end, wherein the lower end of the upwardly inclined section of pipe is connected either directly or indirectly with the pipeline, the upper end of the upwardly inclined section of pipe is connected either directly or indirectly with the first end of the horizontal section of pipe or with the upper end of the downwardly inclined section of pipe, and the second end of the horizontal section of pipe or the lower end of the downwardly inclined section of pipe is connected either directly or indirectly with the riser, and wherein the angle of inclination of the upwardly inclined section of pipe is in the range 5 to 90° to the horizontal, and the length of the upwardly inclined section of pipe is in the range 1 to 30 feet;

b) passing the multi-phase fluid from the pipeline through the device so that liquid accumulates at the base of the upwardly inclined section of pipe thereby forming a liquid slug that backs-up the upwardly inclined section of pipe;

c) allowing the pressure of the gaseous phase to increase behind the liquid slug to a sufficient extent that the liquid slug is forced through either the substantially horizontal section of pipe or the downwardly inclined section of pipe of the device and upwardly through the riser to a surface production facility.

19. A method as claimed in claim 17 wherein (a) the liquid phase of the multiphase fluid stream comprises at least one of oil, gas condensate and produced water and (b) the gaseous phase comprises natural gas.

20. A method as claimed in claim 17 wherein the flow regime of the multiphase fluid stream in the pipeline is stratified flow.

21. A method as claimed in claim 17 wherein gas is injected into the pipeline upstream of the device or is injected into the riser downstream of the device.

22. A device as claimed in claim 2 wherein the length of the substantially horizontal section of pipe or of the downwardly inclined section of pipe of the unit is less than 20 feet.

23. A device as claimed in claim 6 wherein the bend radius is at least 5 pipe diameters.

* * * * *